US009668009B2

(12) United States Patent
Lin

(10) Patent No.: US 9,668,009 B2
(45) Date of Patent: May 30, 2017

(54) SWITCH APPARATUS AND ELECTRONIC DEVICE

(71) Applicant: HON HAI PRECISION INDUSTRY CO., LTD., New Taipei (TW)

(72) Inventor: Ching-Chung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 144 days.

(21) Appl. No.: 14/450,455

(22) Filed: Aug. 4, 2014

(65) Prior Publication Data

US 2015/0042886 A1 Feb. 12, 2015

(30) Foreign Application Priority Data

Aug. 8, 2013 (CN) ........................ 2013 1 03432661

(51) Int. Cl.

| | |
|---|---|
| ***G06F 3/00*** | (2006.01) |
| ***G06F 5/00*** | (2006.01) |
| ***G06F 13/00*** | (2006.01) |
| ***G06F 13/24*** | (2006.01) |
| ***H04N 21/41*** | (2011.01) |
| ***H04N 5/765*** | (2006.01) |

(52) U.S. Cl.
CPC ......... *H04N 21/4135* (2013.01); *H04N 5/765* (2013.01); *H04N 21/4104* (2013.01)

(58) Field of Classification Search
CPC ..................... G06F 13/4022; G06F 2213/4004
USPC ............................. 710/38, 30, 100, 216, 316
See application file for complete search history.

(56) References Cited

U.S. PATENT DOCUMENTS

2006/0106963 A1* 5/2006 Sasaki ..................... A63F 13/12 710/110
2008/0005262 A1* 1/2008 Wurzburg ........... G06F 13/4022 709/217
2008/0155143 A1* 6/2008 Mochizuki ............. G06F 1/325 710/64
2008/0222341 A1* 9/2008 Lin ....................... G06F 13/426 710/316
2009/0009443 A1* 1/2009 Bechtel ............... F21V 33/0052 345/83
2009/0234797 A1* 9/2009 Uno ........................ G06F 21/62
2010/0064076 A1* 3/2010 Chen ................... G06F 13/4022 710/63

* cited by examiner

*Primary Examiner* — Idriss N Alrobaye
*Assistant Examiner* — Getente A Yimer
(74) *Attorney, Agent, or Firm* — Steven Reiss

(57) ABSTRACT

An electronic device connected with numerous first load medias and numerous second load medias. The electronic device comprises a processor and a switch module. The processor is capable of switching between a first working mode and a second working mode. Under the second working mode, the processor generates a second control signal, the switch mode establishes independent electronic connections between a specified first load media and all of the second load medias, thus, the specified first load media simultaneously connects and communicates with all of the second load medias.

2 Claims, 2 Drawing Sheets

SWITCH APPARATUS AND ELECTRONIC DEVICE

CROSS-REFERENCE TO RELATED APPLICATIONS

This application claims priority to Chinese Patent Application No. 201310343266.1 filed on Aug. 8, 2013 in the China Intellectual Property Office, the contents of which are incorporated by reference herein.

FIELD

The present disclosure relates to switches.

BACKGROUND

Television only accesses an external device for displaying images and videos stored in the external device. The communication between the television and the external device is one way.

BRIEF DESCRIPTION OF THE FIGURES

Implementations of the present technology will now be described, by way of example only, with reference to the attached figures.

DETAILED DESCRIPTION

Figure 1:
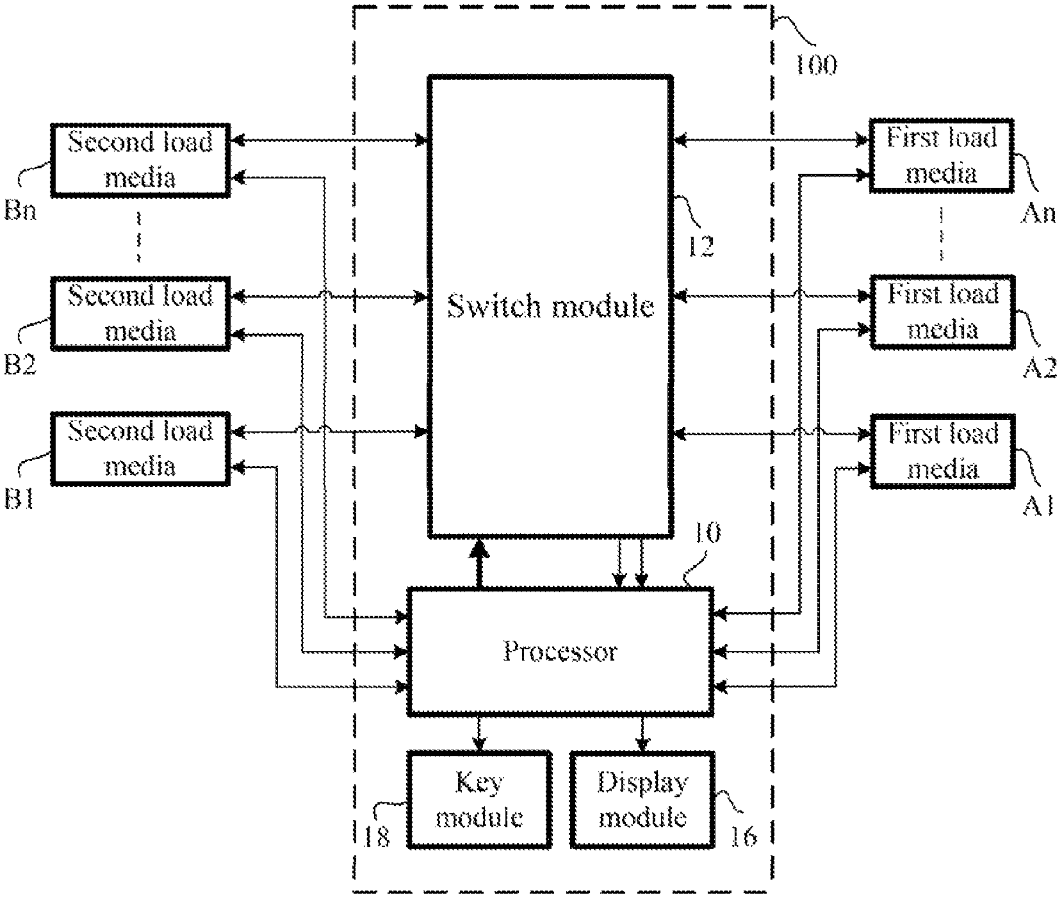
FIG. 1 is a block diagram of an embodiment of an electronic device connected to a plurality of first load medias, the electronic device comprising a processor and a switch module.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

In the present disclosure, "module," refers to logic embodied in hardware or firmware, or to a collection of software instructions, written in a program language. In one embodiment, the program language can be Java, C, or assembly. One or more software instructions in the modules can be embedded in firmware, such as in an erasable programmable read only memory (EPROM). The modules described herein can be implemented as either software and/or hardware modules and can be stored in any type of non-transitory computer-readable media or storage medium. Non-limiting examples of a non-transitory computer-readable medium include CDs, DVDs, flash memory, and hard disk drives.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

An electronic device capable of simultaneously communicating with at least two connected load medias is described.

FIG. 1 illustrates an embodiment of an electronic device 100 connected between a plurality of first load medias A1-An and a plurality of second load medias B1-Bn. In at least one embodiment, the electronic device 100 can connects wirelessly with any or all of the first load medias A1-An. In other embodiments, the electronic device 100 connects via wires with the three load medias A1-An.

The electronic device 100 includes a processor 10, a switch module 12, a display module 16, and an inputting module 18.

The processor 10 connects with the first load medias A1-An and the second load medias B1-Bn, the switch module 12, the display module 16, and the inputting module 18. The processor 10 is capable of switching between a first working mode and a second working mode. The processor 10 obtains the operation interface information of the first load medias A1-An and the second load medias B1-Bn to be displayed on the display module 16. In the first working mode, one of the first load medias A1-An and one of the second load medias B1-Bn are selected by user, and the processor 10 generates a first control signal. In the second working mode, one of the first load medias A1-An is selected by user and none of the second load medias B1-Bn is selected, and the processor 10 generates a second control signal. In at least one embodiment, a predetermined key (not shown) of the inputting module 18 is pressed to switch between the first working mode and the second working mode. The processor 10 also executes one or more computerized codes and other applications of the electronic device 100 to provide functions of the modules.

The switch module 12 makes connections and breaks connections between the first load medias A1-An and second load medias B1-Bn. The switch module 12 turns on to establish an electrical connection between the selected first load media and the selected second load medias in response to the first control signal. Thus the selected first load media and the selected second load medias are in communication with each other. The switch module 12 turns on to establish independent electrical connections between the selected load medias and the second load medias B1-Bn in response to the second control signal. Thus the selected first load media can communicate with one of the second load medias B1-Bn randomly. In at least one embodiment, the communication is a bi-directional data transfer process.

The switch module 12 further generates a locking signal when a read/write operation is occurred between the selected first load media and the selected second load media(s). The processor 10 further controls the switch module 12 to be a locked state in response to the locking signal for preventing interruption to the read/write operation.

The switch module 12 further generates a unlocking signal when the read/write operation is finished between the selected first load media and the selected second media(s). The processor 10 further controls the switch module 12 to be cut off in response to the unlocking signal for cutting off the connection(s) between the selected first load media and the selected second load media(s).

The display module 16 connects with the processor 10. The display module 16 displays interface information which is obtained by the processor 10. In at least embodiment, the display module 16 can be a touch screen.

The inputting module 18 connects with the processor 10. The inputting module 18 switches the working mode of the processor 10. In at least one embodiment, the inputting module 18 can be a virtual keyboard on the display module 16 or buttons presented on the electronic device 100.

Figure 2:
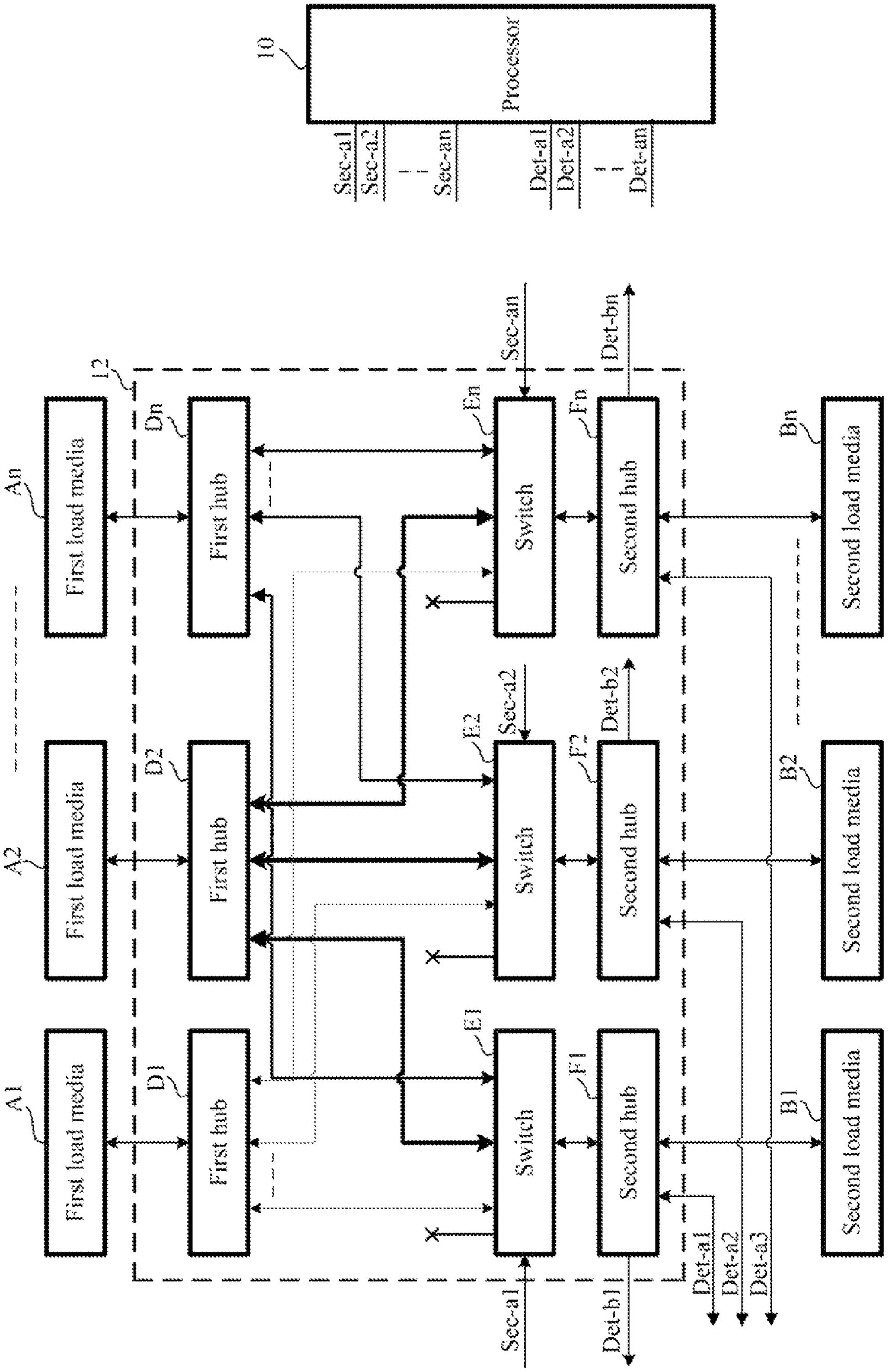
FIG. 2 is a block diagram of an embodiment of the switch module of FIG. 1 of the electronic device of FIG. 1.

FIG. 2 illustrates that the switch module 12 can include a plurality of first hubs D1-Dn, a plurality of switches E1-En, and a plurality of second hubs F1-Fn. In at least one embodiment, the first hubs D1-Dn and the second hubs F1-Fn can be Universal Serial Bus (USB) or External Serial Advanced Technology Attachment (eSATA) type hubs.

Each of the first hubs D1-Dn includes a first input terminal, and a plurality of first output terminals. The first input terminals of the first hubs D1-Dn electrically connect to the first load medias A1-An in a one-to-one relationship. Each of the first hubs D1-Dn simultaneously connects with the switches E1-En through the first output terminals.

Each of the switches E1-En can include a switching terminal, a plurality of first fixed terminals, and a second fixed terminal. Each of the switches E1-En simultaneously connects with the first hubs D1-Dn through the first fixed terminals. Each of the switches E1-En simultaneously connects with the second hubs F1-Fn through the switching terminals. The switching terminal is capable of electrically connecting to one of the corresponding first fixed terminals for turning on the corresponding switch, and is capable of electronically connecting to the corresponding second fixed terminal for turning off the corresponding switch.

Each of the second hubs F1-Fn can include a second input terminal and a plurality of second output terminals. The second input terminals of the second hubs F1-Fn electrically connect to the second load medias B1-Bn in a one-to-one relationship. The second output terminals of the second hubs F1-Fn electrically connect to the processor 10.

Each of the second hubs F1-Fn generates the locking signal while one of the second load medias B1-Bn is in a read/write operation, and generates the unlocking signal while the read/write operation is finished.

The processor 10 can include a plurality of first pins Sec.a1-Sec.an, and a plurality of second pins Det.a1-Det.an. The first Sec.a1-Sec.an pins electrically connect to the switch E1-En in a one-to-one relationship. The second pins Det.a1-Det electrically connect to the second hub F1-Fn in a one-to-one relationship.

In at least one embodiment, under the first working mode, when one of the first load medias A1-An and one of the second load medias B1-Bn are selected, a specified switch connected to a specified second hub corresponding to the selected second load media controls a specified first hub corresponding to the selected first load media to electrically connect with the specified second hub. Thus, the selected user load and the selected second load media are electrically connected. Under the second working mode, one of the first load medias A1-An is selected and none of the second load medias B1-Bn is selected, the switches E1-En establish independent electrical connections between the second output terminals of the second hubs F1-Fn and a specified first hub corresponding to the selected first load media. Thus, the selected first load media is simultaneously connected to all of the second load medias B1-Bn.

For example, under the first working mode, the first load media A1 and the second load media B1 are selected, the switch E1 establishes the connection between the first hub D1 and the second hub F1. Thus, the first load media A1 and the second load media B1 are electrically connected. Further, when the read/write operation in the second load media B1 is occurring, the second hub F1 generates the locking signal. The processor 10 controls the switch E1 to be locked for keeping the connection between the first hub D1 and the second hub F1 in response to the locking signal. When the read/write operation in the second load media B1 is finished, the second hub D1 generates the unlocking signal. The processor 10 controls the switch E1 to cut off the connection between the first hub D1 and the second hub F1 in response to the unlocking signal.

In use, the electronic device 100 is capable of connecting and communicating between a selected first load media and a selected second load media or simultaneously connecting a selected first load to all the second load medias for communicating one of the second load medias B1-Bn randomly. Thus, communication convenience between first load media and second load medias increases.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including matters of shape, size, and arrangement of the parts within the principles of the present disclosure, up to and including the full extent established by the broad general meaning of the terms used in the claims.

What is claimed is:

1. An electronic device simultaneously connected with a plurality of first load medias and a plurality of second load medias, the electronic device comprising:

a processor for generating different control signals; and a switch module connected to the processor, the first load medias, and the second load medias;

wherein the processor switches between a first working mode and a second working mode;

in the first working mode, when a specified first load media and a specified second load media are selected, the processor generates a first control signal and transmits the first control signal to the switch module, and, upon receipt of the first control signal, the switch module establishes an electronic connection between the specified first load media and the specified second load media;

in the second working mode, when a specified first load media is selected and none of the second load media is selected, the processor generates a second control signal and transmits the first control signal to the switch module, and, upon receipt of the second control signal, the switch module establishes independent electronic connections between the specified first load media and all of the second load medias, thereby enabling the specified first load media to communicate with one of the second load medias randomly;

the switch module further generates a locking signal when a read/write operation occurs in the second load media(s), the processor controls the switch module to be in a lock state for preventing the read/write operation from being interrupted in response to the locking signal, and the switch module further generates a unlocking signal when the read/write operation is finished, the processor controls the switch module to be cut off in response to the unlocking signal.

2. A switch apparatus in an electronic device connected with a plurality of first load medias and a plurality of second load medias besides the electronic device; the switch apparatus working under a first working mode or a second working mode; the switch apparatus comprising:

a switch module connected between to the first load medias and the second load medias; and a processor;

wherein under the second working mode, the switch module establishes independent electronically connections between a specified first load media and all of the second load medias, thus the specified load media simultaneously connect with all of the second load medias for communicating any of the second load medias randomly;

the switch module further generates a locking signal when a read/write operation occurs in the second load media(s), the processor controls the switch module to be in a lock state for preventing the read/write operation from being interrupted in response to the locking signal, and the switch module further generates a unlocking signal when the read/write operation is finished, the processor controls the switch module to be cut off in response to the unlocking signal.

* * * * *